United States Patent
Bastide et al.

(10) Patent No.: US 10,951,566 B2
(45) Date of Patent: Mar. 16, 2021

(54) MANAGEMENT OF COMMUNICATIONS BASED ON TOPIC DRIFT

(71) Applicant: International Business Machines Corporation, Armonk, NY (US)

(72) Inventors: Paul R. Bastide, Boxford, MA (US); Matthew E. Broomhall, Goffstown, NH (US); Thomas J. Evans, IV, Cary, NC (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/809,175

(22) Filed: Nov. 10, 2017

(65) Prior Publication Data
US 2019/0149501 A1 May 16, 2019

(51) Int. Cl.
| H04L 12/58 | (2006.01) |
| G06Q 50/00 | (2012.01) |
| G06F 40/30 | (2020.01) |
| G06F 40/289 | (2020.01) |

(52) U.S. Cl.
CPC .............. *H04L 51/16* (2013.01); *G06F 40/30* (2020.01); *G06Q 50/01* (2013.01); *H04L 51/32* (2013.01); *G06F 40/289* (2020.01)

(58) Field of Classification Search
CPC ...... H04L 51/16; H04L 51/32; G06F 17/2785
USPC ........................................................ 709/206
See application file for complete search history.

(56) References Cited

U.S. PATENT DOCUMENTS

| 2006/0010217 | A1* | 1/2006 | Sood ....................... H04L 51/12 |
| | | | 709/206 |
| 2007/0124432 | A1* | 5/2007 | Holtzman ............... H04L 51/16 |
| | | | 709/219 |
| 2010/0011072 | A1* | 1/2010 | Mishchenko .......... G06Q 10/10 |
| | | | 709/206 |
| 2013/0218877 | A1* | 8/2013 | Satyanarayanan ... G06Q 30/016 |
| | | | 707/723 |
| 2016/0188703 | A1 | 6/2016 | Huang et al. |
| 2016/0239558 | A1 | 8/2016 | Borenstein |

(Continued)

FOREIGN PATENT DOCUMENTS

GB 2424972 A 11/2006

OTHER PUBLICATIONS

Help Center—Stack Overflow, https://stackoverflow.com/help/on-topic, retrieved from internet Nov. 9, 2017, 1 page.
(Continued)

*Primary Examiner* — David R Lazaro
*Assistant Examiner* — Zia Khurshid
(74) *Attorney, Agent, or Firm* — L. Jeffrey Kelly; Edell, Shapiro & Finnan, LLC

(57) ABSTRACT

According to one embodiment of the present invention, a system processes messages and includes at least one processor. The system receives a message intended for a collection of messages having a common topic. The message is compared to the common topic of the collection of messages to determine relatedness of the message to the collection of messages. The presentation of the message is altered based on the comparing. Embodiments of the present invention further include a method and computer program product for processing messages in substantially the same manner described above.

9 Claims, 4 Drawing Sheets

(56) References Cited

U.S. PATENT DOCUMENTS

2017/0264578 A1\* 9/2017 Allen ...................... H04L 51/32
2018/0048604 A1\* 2/2018 Mikhailov .............. H04L 51/16

OTHER PUBLICATIONS

ReactiveX, http://reactivex.io/intro.html, retrieved from internet Nov. 9, 2017, 1 page.
SaneBox for Business, SaneBox, Inc., 2017, https://www.sanebox.com/business, 5 pages.

\* cited by examiner

MANAGEMENT OF COMMUNICATIONS BASED ON TOPIC DRIFT

BACKGROUND

1. Technical Field

Present invention embodiments relate to communication systems, and more specifically, to managing a conversation or thread of a communication system based on messages or communications varying or drifting from a topic of the conversation or thread.

2. Discussion of the Related Art

Mail clients and online social networks are universal mechanisms to connect people and information in logical and organized manners. These manners enable sharing and processing of information between users. Common mechanisms of sharing and processing information include an inbox, wall, activity stream, timeline, and profile. These mechanisms enable a user to rapidly share information with others and to gather information from others in social and other networks.

For example, a first user and second user may be long time friends and connected on an online social network. The first user may post a message pertaining to getting engaged to be married. A second user may view the posted message and reply with a comment expressing congratulations. A third user may be a casual acquaintance of the first user, and post a message unrelated to the conversation. This may cause other users to feel uncomfortable adding to the conversation.

SUMMARY

According to one embodiment of the present invention, a system processes messages and includes at least one processor. The system receives a message intended for a collection of messages having a common topic. The message is compared to the common topic of the collection of messages to determine relatedness of the message to the collection of messages. The presentation of the message is altered based on the comparing. Embodiments of the present invention further include a method and computer program product for processing messages in substantially the same manner described above.

BRIEF DESCRIPTION OF THE DRAWINGS

Generally, like reference numerals in the various figures are utilized to designate like components.

DETAILED DESCRIPTION

An embodiment of the present invention manages messages or communications that may vary or drift from a common topic of a conversation or thread. A pending message to be posted (to a thread or conversation) is initially detected. Prior messages linked or related to a presentation of the message are analyzed, and the dilution or drift for the pending message from a common topic of the prior messages is determined. The presentation of the pending message or the message contents may be altered. For example, messages which drift from a common topic of the conversation or thread may be hidden, a hashtag or other indicator, such as #hashtag, @mention, etc., may be added, etc.

The message drift may be calculated based on a message view of all other users in the network, and statistically analyzed. A state or age of the conversation and status of the online social network with respect to messages may be examined to determine message drift. Further, a sway of the topic may be leveraged using a visual subject drift in real-time as a subscriber. In this case, topic drift may be illustrated graphically and sufficient changes in the topic drift may be detected and sent to subscribers. In this case, a subscriber may alter presentation of the conversation or thread based on the topic drift.

Present invention embodiments provide several advantages. For example, messages may be managed to avoid topic drift or dilution within conversations or threads. This improves conversations, forums, and question and answer utilities, such as QUORA, TWITTER, IBM CONNECTIONS, STACKOVERFLOW, etc. Further, present invention embodiments may be added to a collaboration or social portfolio, such as those available from FACEBOOK, TWITTER, GOOGLE, etc., to enhance the user experience. Present invention embodiments may remove or otherwise handle messages varying from a topic of a conversation to provide conversations or threads with cohesive messages that collectively are readily comprehendible.

Figure 1:
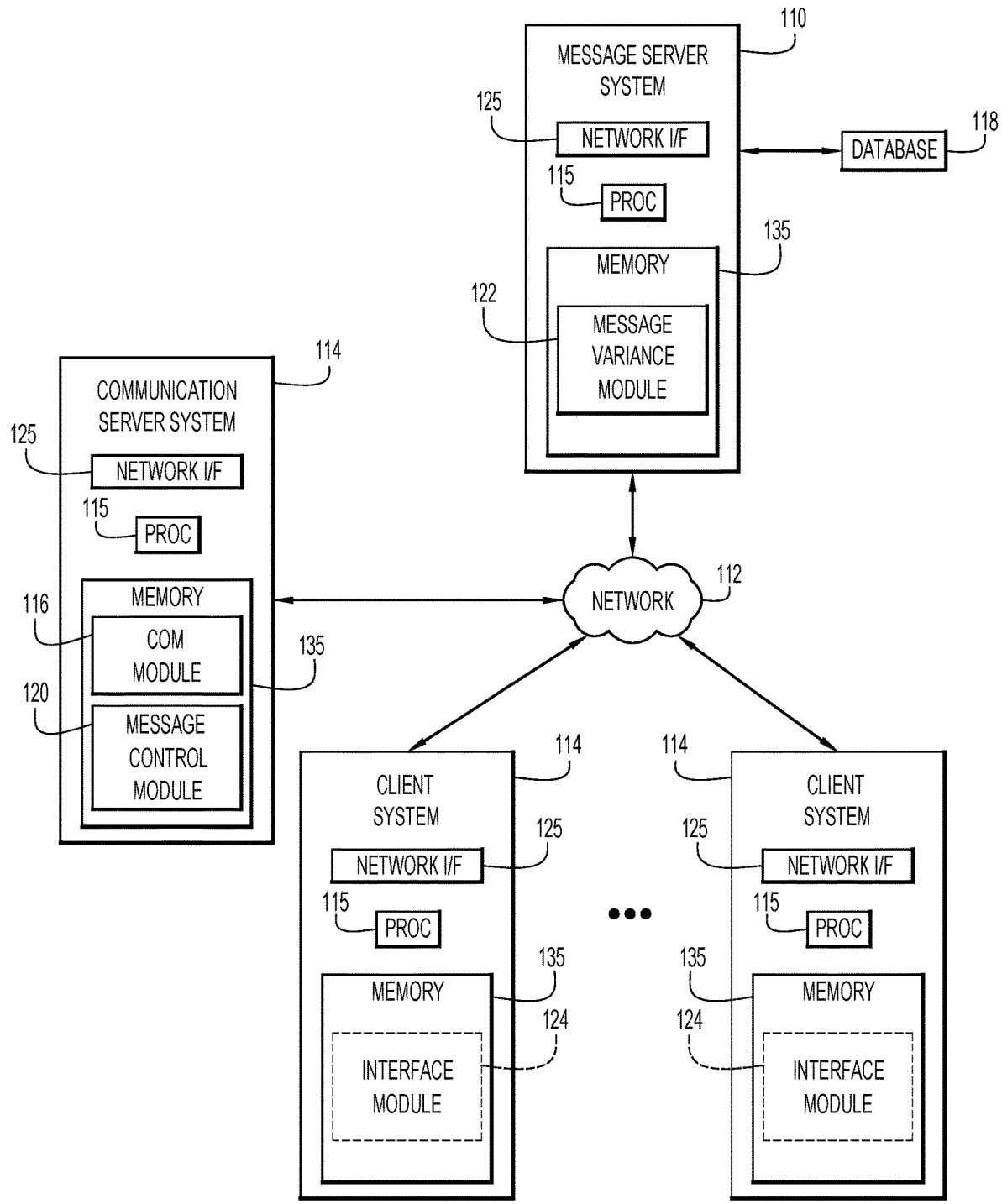
FIG. 1 is a diagrammatic illustration of an example computing environment of an embodiment of the present invention.

An example environment of an embodiment of the present invention embodiment is illustrated in FIG. 1. Specifically, the environment includes one or more message server systems 110, one or more client or end-user systems 114, and one or more communication server systems 130. Message server systems 110, client systems 114, and communication server systems 130 may be remote from each other and communicate over a network 112. The network 112 may be implemented by any number of any suitable communications media, such as a wide area network (WAN), a local area network (LAN), Internet, Intranet, etc. Alternatively, message server systems 110, client systems 114, and/or communication server systems 130 may be local to each other, and communicate via any appropriate local communication medium, such as a local area network (LAN), hardwire, wireless links, Intranet, etc.

Client systems 114 enable users to interact with communication server systems 130 to send and receive messages or communications. Communication server systems 130 include a communication module 116 and a message control module 120. Communication module 116 provides a platform for communications between users. The platform may include electronic (email) communications, social networks, text messaging, chats, instant messaging, forums, conversation threads, or any other message exchange platform. Message control module 120 detects and intercepts new messages to be posted, and provides those messages to message server systems 110 for analysis.

Message server systems 110 receive and analyze messages to be posted for topic drift. Message server systems 110 include a message variance module 122 to determine topic drift within messages as described below. When sufficient topic drift exists for a message, presentation of the message and/or conversation or thread may be altered.

A database system 118 may store various information for the topic drift determination, such as topic drift or variance scores, access scores, topic drift parameters, thresholds, dictionaries, etc. The database system 118 may be implemented by any conventional or other database or storage unit, may be local to or remote from message server systems 110, client systems 114, and/or communication server systems 130, and may communicate via any appropriate communication medium, such as a local area network (LAN), a wide area network (WAN), Internet, hardwire, wireless link, Intranet, etc.

Client systems 114 may include an interface module 124 that interacts with communication module 116 of communication server systems 130 to interact with the platform. For example, interface module 124 may include a browser to interact with a social network site, forum, conversation thread, or any other message exchange site. By way of further example, interface module 124 may include various applications, such as those for electronic (email) communications, text messaging, chats, instant messaging, or other message exchange mechanisms. The client systems 114, via interface module 124, may present a graphical user or other interface to solicit information from users pertaining to the desired actions, and may provide displays or interfaces presenting the messages. The interface may include a GUI, command line prompts, menu screens, etc.

Message server systems 110, client systems 114, and communication server systems 130 may be implemented by any conventional or other computer systems, such as a laptop, desktop, tablet, smartphone or other mobile computing device, etc. The message server systems 110, client systems 114, and communication server systems 130 are preferably equipped with a display or monitor, a base, optional input devices, and any commercially available and custom software. The base preferably includes at least one hardware processor 115, such as a microprocessor, controller, central processing unit (CPU), etc., one or more memories 135, and internal or external network interfaces or communications devices 125. The communications devices may include a modem, network cards, etc., while the input devices may include a keyboard, mouse, touch screen, or other input device. The software may include server/communications software, communication module 116, message control module 120, message variance module 122, interface module 124, etc., and is provided for execution by at least one hardware processor 115.

The communication module 116, message control module 120, message variance module 122, and interface module 124 may include one or more modules or units to perform the various functions of present invention embodiments described below. These modules may be implemented by any combination of any quantity of software and/or hardware modules or units, and may reside within memory 135 of the message server systems 110, client systems 114, and/or communication server systems 130 for execution by processor 115.

Present invention embodiments detect a new message or comment for a conversation or thread. The new message is analyzed in relation to the conversation or thread. For example, the new message and other conversation messages may be converted to n-grams to determine an amount of overlap between the new message and the conversation. When the new message contains minimal overlap and drifts from a common topic of the conversation, a score is determined indicating a high degree of drift with minimal linkage to prior messages of the conversation. The user providing the new message may be prompted to send a direct message, and the new message may be hidden or deleted from the conversation. Present invention embodiments may be utilized with any social network or messaging system, such as TWITTER, FACEBOOK, IBM CONNECTIONS, JIVE, YAMMER MESSAGING—OUTLOOK, GMAIL, LOTUS NOTES, etc.

Figure 2:
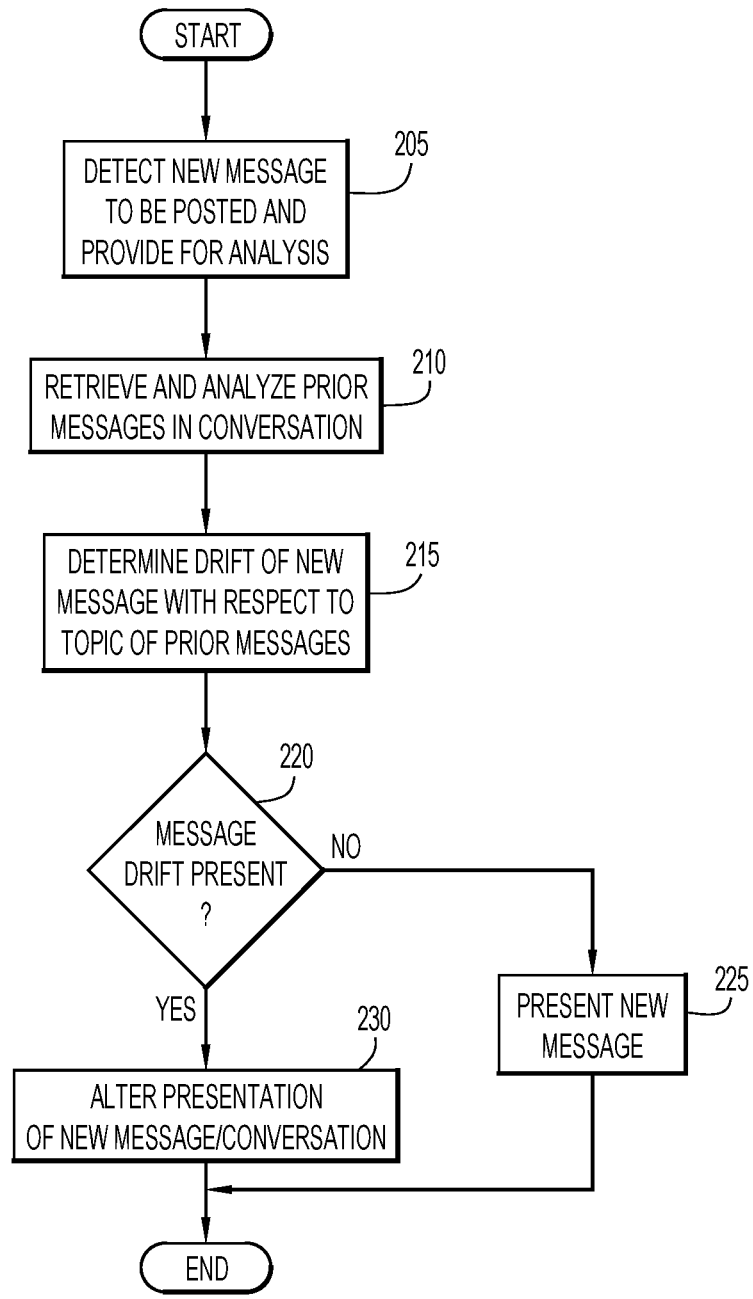
FIG. 2 is a procedural flowchart illustrating a manner of managing a conversation or thread based on variance of a communication or message from a common topic of the conversation or thread according to an embodiment of the present invention.

A manner of managing a conversation or thread based on variance of a communication or message from a common topic of the conversation or thread according to an embodiment of the present invention is illustrated in FIG. 2. Initially, a user may enter a new message to be posted to a thread or conversation provided by communication module 116 of a communication server system 130. The new message may include an email, comment, reply, or any other type of message, and may be entered from an interface provided by interface module 124 on a client system 114. The entry of the new message may employ a three-phase commit process, such as [DRAFT ANALYZE POST], where each new message traverses these phases. The new message is preferably directed from client system 114 to a communication server system 130 for posting to the conversation or thread.

Message control module 120 of communication server system 130 detects and intercepts the new message at step 205 prior to processing by communication module 116 that maintains the conversation or thread. The message control module 120 provides the new message to message variance module 122 of a message server system 110 to determine drift or variance of the new message from a common topic of the conversation or thread.

The detection and interception of the new message may be accomplished in various manners. For example, the new message may be handled as a push event, where the content of each event or new message is published to a subscriber, and the subscriber acts on the message. In this case, message control module 120 of communication server system 130 may detect the new message and publish the new message to message variance module 122 of message server system 110. The publication may be accomplished by any conventional or custom application programming interfaces (APIs), such as GNIP or COMPLIANCE APIs.

The new message may be handled as a pull event, where content is continuously monitored by the message control module 120 of communication server system 130 for an updated entry added to a message list. For example, HOOTSUITE, TWITTER FEEDS, IBM CONNECTIONS OPENSOCIAL ACTIVITY STREAM each provide a feed that is continually updated. In this case, when a new message is detected, message variance module 122 of message server system 110 is notified by message control module 120 of communication server system 130 and the new message is retrieved by the message variance module 122.

Moreover, a user interface listener may detect a document object model (DOM) event indicating entry of a new message on a user interface provided by interface module 124 on client system 114. Message control module 120 of communication server system 130 may receive notification of the event, and provide the new message to message variance module 122 of message server system 110. Alternatively, message control module 120 of communication server system 130 may notify message variance module 122 of message server system 110 of the event to enable the message variance module 122 to retrieve the new message.

The detection and processing of new messages for drift or variance may be limited to a specific user or group of users, or enabled for all users of a message exchange platform. Further, the detection and processing of new messages may be used with specific messages or communications of a certain length or form. In these cases, various parameters may be utilized defining the desired constraints for the messages. Message control module 120 of communication server system 130 may examine these parameters in response to detecting a new message to determine whether or not the new message is to be provided to message variance module 122 of message server system 110 for processing.

Once the new message is detected and received by the message variance module 122 of message server system 110, each message in the conversation or thread is retrieved at step 210. The message variance module may retrieve these messages from communication server system 130 to determine drift or variance of the new message as described below. Each message is converted into natural language elements, such as n-grams, grammars, lemma forms, etc., and may be augmented with additional context and information to enable the drift or variance to be minimized or normalized for each message (rather than assume each message has drift). Messages with one or a few words may be ignored, and a relationship map between messages may be generated which spans conversations.

Message variance module 122 of message server system 110 determines the variance or drift of the new message at step 215. In particular, a variance score for the new message is determined based on an amount of overlap with the prior messages of the thread or conversation. For example, the n-grams of the new message are compared to the n-grams of each prior message of the conversation or thread. By way of example, the n-grams may include 2-grams, where each message is partitioned into groups of two consecutive words. However, any desired length for an n-gram may be utilized. The n-grams may be compared for exact or partial matches, or for words that are considered related. Relations of words may be stored in a dictionary that may be utilized to provide related words for n-grams for the comparison. The quantity of n-grams in common between the new message and the prior messages may be determined to represent the variance score. The variance score may be compared to a variance threshold to determine that the new message has insufficient variance and is related to the conversation or thread. The variance threshold may indicate a quantity or percentage of the n-grams of the prior messages required to be in common with the new message to be considered related to the conversation or thread.

However, a lack of overlap may alternatively be measured and counted per occurrence. In this case, the variance threshold may indicate a quantity or percentage of the n-grams of the prior messages not in common with the new message to be considered unrelated to the conversation or thread.

Alternatively, the n-grams of the new message may be compared to the n-grams of each individual prior message to determine the variance score for each prior message. The variance scores may be compared to a message variance threshold to determine prior messages with sufficient overlap with the new message. The message variance threshold may indicate a quantity or percentage of the n-grams of the new message required to be in common with a prior message to be related to the prior message. The new message is considered to have sufficient drift or variance to be unrelated to the conversation or thread when an insufficient quantity of prior messages overlap with the new message. This may be determined by comparing the quantity of prior messages with sufficient overlap to the variance threshold. In this case, the variance threshold may indicate a quantity of prior messages required to have sufficient overlap with the new message for the new message to be related to the conversation or thread.

However, a lack of overlap may alternatively be measured and counted per occurrence. In this case, the message variance threshold may indicate a quantity or percentage of the n-grams of the new message not in common with a prior message to be considered unrelated to the prior message. The new message is considered to have sufficient drift or variance to be unrelated to the conversation or thread when a sufficient quantity of prior messages do not overlap with the new message. In this case, the variance threshold may indicate a quantity of prior messages required to have insufficient overlap with the new message for the new message to be unrelated to the conversation or thread.

Sentiment of the new and prior messages may be utilized to determine the variance score for drift or variance of the new message. In this case, sentiment may be determined for the new and prior messages based on various conventional or other natural language processing (NLP) techniques, such as sentiment analysis, affinity analysis, etc. The sentiment may include positive, neutral, and negative sentiment. The combinations of sentiment between the new message and a prior message may each be assigned a sentiment value. For example: a same sentiment for the new message and a prior message may be assigned a first sentiment value, such as a positive value; a different sentiment for the new message and a prior message with one of the sentiments being neutral may be assigned a second sentiment value, such as zero; and a different sentiment for the new message and a prior message, with neither sentiment being neutral, may be assigned a third sentiment value, such as a negative value. The sentiment of the new message is compared to the sentiment of each prior message and the corresponding values from the sentiments are summed to produce the variance score. The variance score may be compared to the variance threshold to determine that the new message has sufficient variance to be unrelated to the conversation or thread. For example, the variance threshold in this case may be zero, where a negative variance score indicating different sentiments may indicate drift or variance of the new message from the conversation or thread. However, the sentiment values may assigned in any manner, and the sentiment values and corresponding variance threshold may be any desired values to indicate relatedness of the new message to the thread or conversation.

The variance scores may be determined for messages across conversations, and the variance scores may be determined from, or based on, the message view of all other users in the message exchange platform. Further, the variance scores may be statistically analyzed by various conventional or other techniques, such as regression or other analysis, clustering, etc., to provide a resulting indication of whether or not a new message is unrelated to a conversation or thread.

In addition, machine learning may be employed to determine whether or not a new message is related to a conversation or thread. In this case, messages, conversations or threads, and/or variance scores may be stored. This information may be used and/or processed against training sets with user provided or known outcomes of relatedness to learn when new massages are related or unrelated to a conversation or thread. The variance scores and thresholds may be adjusted based on the learning to dynamically adapt the determination. Various models may be employed to perform the learning (e.g., neural networks, mathematical/statistical models, classifiers, etc.). For example, a variance score may indicate a new message is related to the conversation. However, for some reasons, the message may still be unrelated to a conversation or thread. These aspects may be learned and employed to adjust variance scores, thresholds, and/or to alter a determination of relatedness of a new message.

When the new message is considered related to the conversation or thread as determined at step 220, the new message is presented in the conversation or thread at step 225. In this case, the determination is provided by message variance module 122 of message server system 110 to message control module 120 of communication server system 130. The message control module 120 enables the communication module 116 to insert the new message into the conversation or thread for presentation by interface module 124 on client system 114. Alternatively, the communication module 116 may provide presentation alterations to interface module 124 to display the new message in the conversation or thread on client system 114.

When the new message is considered unrelated to the conversation or thread as determined at step 220, the presentation of the conversation or thread is altered to accommodate the new message at step 230. In this case, the determination is provided by message variance module 122 of message server system 110 to message control module 120 of communication server system 130. The message control module 120 enables the communication module 116 to alter the presentation of the conversation or thread to accommodate the new message for display by interface module 124 on client system 114. Alternatively, the communication module 116 may provide presentation alterations to interface module 124 to alter and display the conversation or thread on client system 114.

For example, the new message may be hidden from the conversation or thread. This may pertain to hiding messages for a specific group of people, specific users, or for users not engaged in the conversation. In addition, a user sending the new message may be prompted to send the new message as a direct message to the user initiating the conversation or thread.

Further, the new message may be modified. For example, the new message may be used to form one or more separate conversations or threads. The new message may be considered a private message, posted to a specific board, or modified to include an at (@) mention, hashtag, or other indicator the users share in common.

In addition, an access score may be determined for each message added to the conversation or thread subsequent to an initial message initiating the conversation or thread. The access score indicates the relatedness of a corresponding message to the conversation or thread, and may utilize or be derived from the variance score described above. Access control lists are associated with access scores or ranges of access scores, and each access control list indicates users and corresponding access privileges to access the messages with access scores corresponding to the access scores or ranges of access scores associated with that access control list. A high access score indicates a related message, and is preferably associated with an access control list having numerous users indicating the message may be publicly accessible to users. A lower access score indicates an unrelated message, and is preferably associated with an access control list containing limited users indicating the message has lower visibility and may be restricted to select users. The access control lists may be utilized by communication module 116 of communication server system 130 to limit access or visibility of messages to users in accordance with those lists.

The alteration of the presentation may be based on additional criteria, such as the state or age of the conversation, the frequency of messages, and the activity of the user that owns the conversation. Further, a sway of the topic may be leveraged using a visual subject drift in real-time as a subscriber. In this case, topic drift may be illustrated graphically and sufficient changes in the topic drift may be detected and sent to subscribers. In this case, a subscriber, such as message control module 120, may alter presentation of the conversation or thread based on the topic drift.

Operation of an embodiment of the present invention is described with reference to FIGS. 3A-3D. By way of example, a conversation 300 (FIG. 3A) includes a message 305 from a first user (USER 1 as viewed in FIG. 3A) pertaining to getting engaged to be married, and a message or reply 310 from a second user (USER 2 as viewed in FIG. 3A) with a comment expressing congratulations. A new message 315 from a third user (USER 3 as viewed in FIG. 3A) is submitted for posting from client system 114, and includes a comment pertaining to meeting for dinner which is unrelated to the conversation.

Message control module 120 of communication server system 130 detects and intercepts the new message, and enables message variance module 122 of message server system 110 to analyze the message as described above. The message variance module 122 determines that new message 315 is unrelated to conversation 300, and provides an indication of the determination to message control module 120 to alter the presentation of conversation 300 as described above.

Figure 3A:
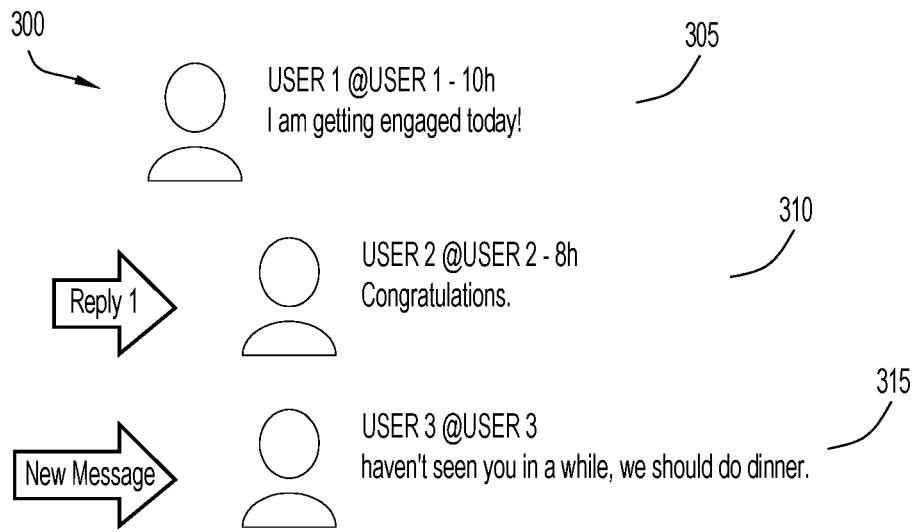
FIG. 3A is an illustration of an example conversation or thread.
Figure 3B:
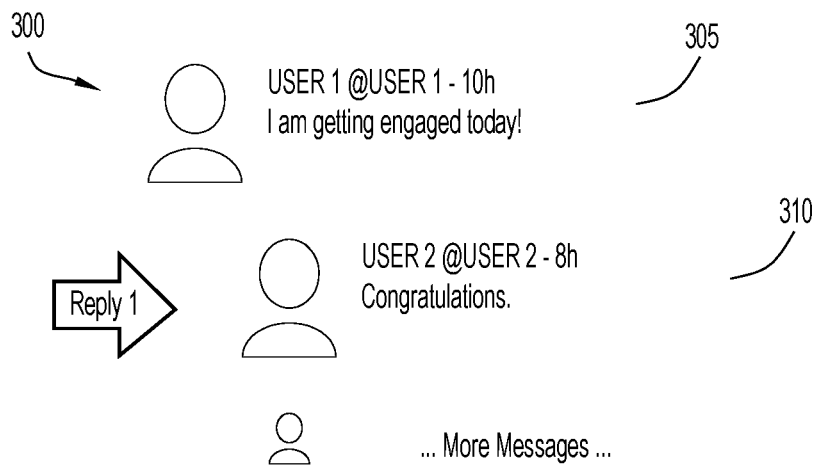
FIG. 3B is an illustration of the example conversation or thread of FIG. 3A with a new message varying from the conversation or thread being hidden according to an embodiment of the present invention.

Referring to FIG. 3B, conversation 300 may be altered by hiding new message 315 from conversation 300. In this case, conversation 300 includes message 305 from the first user (USER 1 as viewed in FIG. 3B) pertaining to the engagement, and message 310 from the second user (USER 2 as viewed in FIG. 3B) expressing congratulations. In addition, the third user sending the new message 315 may be prompted to send the new message as a direct message to the first user initiating the conversation 300.

Figure 3C:
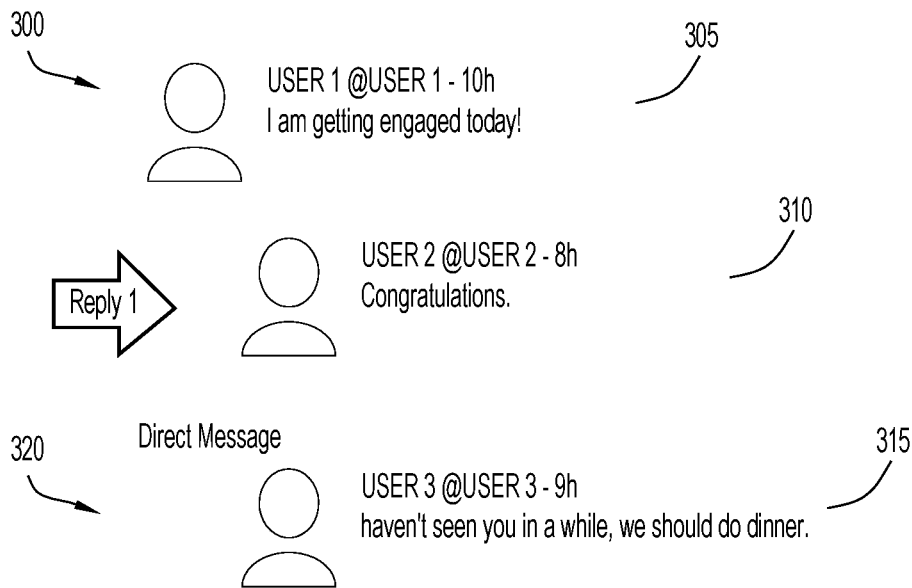
FIG. 3C is an illustration of the example conversation or thread of FIG. 3A with a new message varying from the conversation or thread being provided in a separate conversation or thread according to an embodiment of the present invention.

Conversation 300 may be altered by creating a new conversation as illustrated in FIG. 3C. In this case, conversation 300 includes message 305 from the first user (USER 1 as viewed in FIG. 3C) pertaining to the engagement, and message 310 from the second user (USER 2 as viewed in FIG. 3C) expressing congratulations. A new conversation 320 is created between the first user and the third user. Conversation 320 includes message 315 from the third user pertaining to meeting for dinner, and may further include message 305 from the first user pertaining to the engagement. Message 315 may be a direct message to the first user.

Figure 3D:
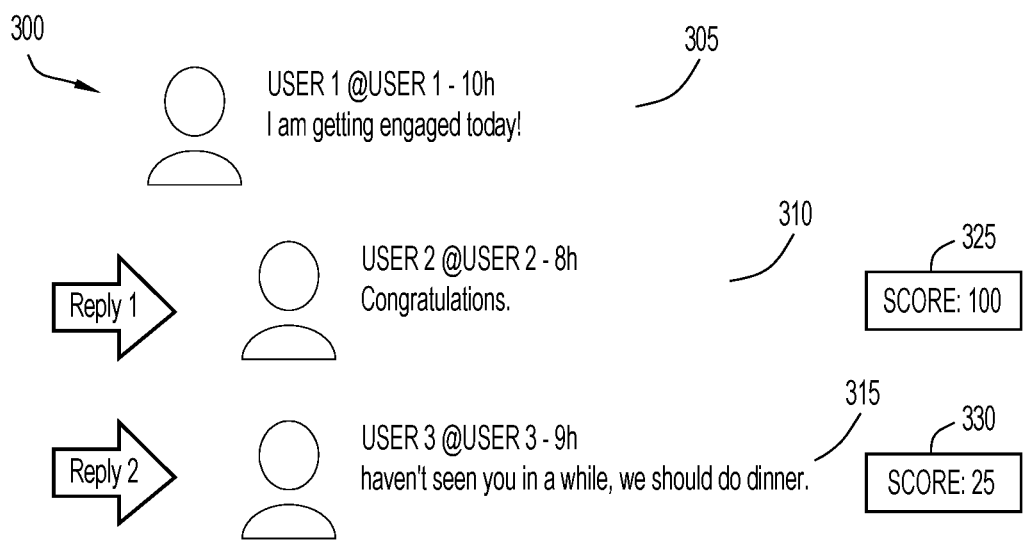
FIG. 3D is an illustration of the example conversation or thread of FIG. 3A with each message having access restrictions based on relatedness to the conversation or thread according to an embodiment of the present invention.

Referring to FIG. 3D, an access score is determined for each message subsequent to the initial message 305 in conversation 300 to limit access to the messages. In this case, conversation 300 includes message 305 from the first user (USER 1 as viewed in FIG. 3D) pertaining to the engagement, message 310 from the second user (USER 2 as viewed in FIG. 3C) expressing congratulations, and message 315 from the third user (USER 3 as viewed in FIG. 3D) including a comment pertaining to meeting for dinner. Message 310 and 315 each have an access score 325, 330 indicating relatedness of the message to the conversation. The access score may utilize or be derived from the variance score as described above. Access control lists are associated with access scores to limit access to the particular message. By way of example, message 310 has an access score 325 with a value of 100 indicating message 310 is related to conversation 300. The access control list associated with this score contains numerous users, thereby enabling access on a large or public scale. By way of further example, message 315 has an access score 330 with a value of 25 indicating message 315 is unrelated to conversation 300. The access control list associated with this score contains limited users, thereby restricting access to select users. The access scores or other indicators may be presented in the conversation to indicate any access restrictions.

It will be appreciated that the embodiments described above and illustrated in the drawings represent only a few of the many ways of implementing embodiments for management of communications based on topic drift.

The environments of the present invention embodiments may include any number of computer or other processing systems, such as client or end-user systems, server systems, etc., and databases or other repositories arranged in any desired fashion, where the present invention embodiments may be applied to any desired type of computing environment. For example, the computing environment may include cloud computing, client-server, network computing, mainframe, stand-alone systems, etc. The computer or other processing systems employed by the present invention embodiments may be implemented by any number of any personal or other type of computer or processing system, such as a desktop, laptop, PDA, tablets, smartphones, mobile computing devices, etc., and may include any commercially available operating system and any combination of commercially available and custom software. The software may include browser software, communications software, server software, communication module, message control module, message variance module, interface module, etc. These systems may include any types of monitors and input devices, such as a keyboard, mouse, voice recognition, and the like, to enter and/or view information.

It is to be understood that the communication module, message control module, message variance module, interface module, and other software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as a LAN, WAN, Intranet, Internet, hardwire, modem connection, wireless, etc. For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium of a stationary or portable program product apparatus or device for use with stand-alone systems or systems connected by a network or other communications medium. The computer useable medium may include magnetic or optical mediums, magneto-optic mediums, floppy diskettes, CD-ROM, DVD, memory devices, etc.

The communication network may be implemented by any number of any type of communications network, such as a LAN, WAN, Internet, Intranet, VPN, etc. The computer or other processing systems of the present invention embodiments may include any conventional or other communications devices to communicate over the network via any conventional or other protocols. The computer or other processing systems may utilize any type of wired or wireless connection for access to the network. Local communication media may be implemented by any suitable communication media, such as a local area network (LAN), hardwire, wireless link, Intranet, etc.

The system may employ any number of any conventional or other databases, data stores or storage structures, such as files, databases, data structures, data or other repositories, etc., to store information. The information may include: topic drift or variance scores, access scores, topic drift parameters, thresholds, dictionaries, access control lists, etc. The database system may be implemented by any number of any conventional or other databases, data stores or storage structures, such as files, databases, data structures, data or other repositories, etc., to store information. The database system may be included within or coupled to the server and/or client systems. The database systems and/or storage structures may be remote from or local to the computer or other processing systems, and may store any desired data.

The present invention embodiments may employ any number of any type of user interface, such as a Graphical User Interface (GUI), command-line, prompt, etc., for obtaining or providing information, where the interface may include any information arranged in any fashion. The information for the interface may include desired actions, messages, conversations or threads, etc. The interface may include any number of any types of input or actuation mechanisms, such as buttons, icons, fields, boxes, links, etc., disposed at any locations to enter/display information and initiate desired actions via any suitable input devices. The input devices may include a mouse, keyboard, and the like. The interface screens may include any suitable actuators, such as links, tabs, etc., to navigate between the screens in any fashion.

The report may include any information arranged in any fashion, and may be configurable based on rules or other criteria to provide desired information to a user.

The present invention embodiments are not limited to the specific tasks or algorithms described above, but may be utilized for messages or communications of any message or communication system. The messages may be of any conversation or thread, or nested conversation or thread, and may be analyzed for relatedness to alter the presentation. Messages may be filtered for processing of relatedness based on any desired parameters, such as message characteristics, individual users or user groups sending or receiving the message, etc.

The variance, access and other scores may be of any values within any value ranges, and may be determined based on any measures of overlap between any content or attributes. The thresholds may be set to any desired values to indicate relatedness to a conversation or thread. The relatedness determination may be based on measurements of overlap or non-overlap between a new message and a conversation or thread. The presentation may be altered in any fashion to indicate unrelated messages to a conversation, such as highlight the unrelated message, delete the unrelated message, initiate a new conversation or thread for the unrelated message, etc. Access to the messages may be controlled in any fashion, and based on any desired parameters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing messages comprising:
  intercepting, via a processor, a message intended for a collection of messages of a message thread having a common topic;
  comparing, via the processor, the message to the common topic to determine relatedness of the message to the collection of messages of the message thread, wherein comparing the message to the common topic comprises:
    partitioning the message and each message of the collection of messages into message portions including a plurality of consecutive terms;
    comparing the message portions of the message to the message portions of the collection of messages to determine a quantity of overlapping message portions representing a variance score;
    comparing the variance score to a variance threshold to determine the relatedness of the message to the collection of messages;
  determining an access score for the message indicating a relatedness of the message to the common topic of the collection of messages; and
  associating an access control list with the message based on the access score, wherein the access control list indicates a quantity of users and corresponding access privileges, and wherein the access control list for a message with greater relatedness to the common topic indicates a greater quantity of users relative to an access control list for a message with less relatedness to the common topic; and
  altering, via the processor, a presentation of the message within the message thread in response to the message being unrelated to the common topic based on the variance score failing to satisfy the variance threshold, wherein altering the presentation of the message further comprises:
    controlling a degree of public access of the message in accordance with the access control list associated with the message.

2. The method of claim 1, wherein altering the presentation of the message further comprises:
  deleting the message from the collection of messages.

3. The method of claim 1, wherein the collection of messages includes a thread of a social network.

4. A system for processing messages comprising:
  at least one processor configured to:
    intercept a message intended for a collection of messages of a message thread having a common topic;
    compare the message to the common topic to determine relatedness of the message to the collection of messages of the message thread, wherein comparing the message to the common topic comprises:
      partitioning the message and each message of the collection of messages into message portions including a plurality of consecutive terms;
      comparing the message portions of the message to the message portions of the collection of messages to determine a quantity of overlapping message portions representing a variance score;
      comparing the variance score to a variance threshold to determine the relatedness of the message to the collection of messages;
    determining an access score for the message indicating a relatedness of the message to the common topic of the collection of messages; and
    associating an access control list with the message based on the access score, wherein the access control list indicates a quantity of users and corresponding access privileges, and wherein the access control list for a message with greater relatedness to the common topic indicates a greater quantity of users relative to an access control list for a message with less relatedness to the common topic; and alter a presentation of the message within the message thread in response to the message being unrelated to the common topic based on the variance score failing to satisfy the variance threshold, wherein altering the presentation of the message further comprises:

controlling a degree of public access of the message in accordance with the access control list associated with the message.

5. The system of claim 4, wherein altering the presentation of the message further comprises:

deleting the message from the collection of messages.

6. The system of claim 4, wherein the collection of messages includes a thread of a social network.

7. A computer program product for processing messages, the computer program product comprising one or more computer readable storage media collectively having program instructions embodied therewith, the program instructions executable by at least one processor to cause the at least one processor to:

intercept a message intended for a collection of messages of a message thread having a common topic;

compare the message to the common topic to determine relatedness of the message to the collection of messages of the message thread, wherein comparing the message to the common topic comprises:

partitioning the message and each message of the collection of messages into message portions including a plurality of consecutive terms;

comparing the message portions of the message to the message portions of the collection of messages to determine a quantity of overlapping message portions representing a variance score;

comparing the variance score to a variance threshold to determine the relatedness of the message to the collection of messages;

determining an access score for the message indicating a relatedness of the message to the common topic of the collection of messages; and associating an access control list with the message based on the access score, wherein the access control list indicates a quantity of users and corresponding access privileges, and wherein the access control list for a message with greater relatedness to the common topic indicates a greater quantity of users relative to an access control list for a message with less relatedness to the common topic; and alter a presentation of the message within the message thread in response to the message being unrelated to the common topic based on the variance score failing to satisfy the variance threshold, wherein altering the presentation of the message further comprises:

controlling a degree of public access of the message in accordance with the access control list associated with the message.

8. The computer program product of claim 7, wherein altering the presentation of the message further comprises:

deleting the message from the collection of messages.

9. The computer program product of claim 7, wherein the collection of messages includes a thread of a social network.

* * * * *